(12) United States Patent
Boyd et al.

(10) Patent No.: US 8,026,827 B1
(45) Date of Patent: Sep. 27, 2011

(54) VIRTUAL PUSH BUTTON SWITCH

(75) Inventors: Michael Boyd, Saline, MI (US); Kang Li, Windsor, CA (US)

(73) Assignee: Yazaki North America, Inc., Canton, MI (US)

( * ) Notice: Subject to any disclaimer, the term of this patent is extended or adjusted under 35 U.S.C. 154(b) by 361 days.

(21) Appl. No.: 12/435,096

(22) Filed: May 4, 2009

(51) Int. Cl.
*G08B 5/00* (2006.01)
*G08B 13/18* (2006.01)
*H03M 11/00* (2006.01)
*G06F 3/042* (2006.01)

(52) U.S. Cl. ............. 340/815.4; 340/815.5; 340/815.54; 340/815.55; 340/555; 340/556; 341/31; 200/313; 200/317; 200/DIG. 47; 345/175

(58) Field of Classification Search ................ 340/815.4; 341/31
See application file for complete search history.

(56) References Cited

U.S. PATENT DOCUMENTS

| | | |
|---|---|---|
| 2,285,374 A | 6/1942 | Dohsmann et al. |
| 3,448,458 A | 6/1969 | Carlson et al. |
| 3,781,092 A | 12/1973 | Sussman et al. |
| 3,829,771 A | 8/1974 | Burkhardt et al. |
| 3,890,033 A | 6/1975 | McGee |
| 4,484,179 A | 11/1984 | Kasday |
| 4,553,842 A | 11/1985 | Griffin |
| 4,761,715 A | 8/1988 | Brooks |
| 4,762,990 A | 8/1988 | Caswell et al. |
| 5,031,985 A | 7/1991 | Shinoda et al. |
| 5,046,806 A | 9/1991 | Kidder et al. |
| 5,090,791 A | 2/1992 | Kidder et al. |
| 5,220,409 A | 6/1993 | Bures |
| 5,294,940 A | 3/1994 | Wennagel et al. |
| 5,353,735 A | 10/1994 | Arai et al. |
| 5,424,533 A | 6/1995 | Schmutz |
| 5,805,119 A | 9/1998 | Erskine et al. |
| 5,825,495 A | 10/1998 | Huber |
| 5,971,569 A | 10/1999 | Smith et al. |
| 5,982,352 A | 11/1999 | Pryor |
| 6,317,037 B1 | 11/2001 | Ayres et al. |
| 6,766,036 B1 | 7/2004 | Pryor |
| 7,084,859 B1 | 8/2006 | Pryor |
| 7,097,316 B2 | 8/2006 | Sumiyoshi |
| 7,193,729 B1 | 3/2007 | Li |
| 7,448,341 B2 | 11/2008 | Cook et al. |
| 7,466,843 B2 | 12/2008 | Pryor |
| 7,669,543 B2 | 3/2010 | Soltendieck et al. |
| 7,779,774 B2 | 8/2010 | Liu |
| 7,798,026 B2 | 9/2010 | Takato et al. |
| 2008/0134956 A1 | 6/2008 | Cook et al. |
| 2008/0173233 A1 | 7/2008 | Liu |
| 2010/0236471 A1 | 9/2010 | Cook |

OTHER PUBLICATIONS

U.S. Appl. No. 12/275,365, filed Apr. 19, 2011, Li, et al.
U.S. Appl. No. 12/422,692, filed Jun. 7, 2011, Boyd, et al.

*Primary Examiner* — Donnie Crosland
(74) *Attorney, Agent, or Firm* — Harness, Dickey & Pierce, P.L.C.

(57) ABSTRACT

A user interface display system can include at least one user responsive element. The user responsive element can include an optical mechanism. A pulsed light source can produce a light beam. Apparatus are provided for causing the light beam to repeatedly scan across the activity field. A controller can be arranged to repeatedly turn the light source on at one or more predetermined scan positions to illuminate the user responsive element. The controller can also be programed to act upon a signal regarding the status of the element. A photo detector can send the signal to the controller. The optical mechanism acts upon the light beam differently based upon the status of the user responsive element.

19 Claims, 5 Drawing Sheets

VIRTUAL PUSH BUTTON SWITCH

FIELD

The present disclosure relates to analog displays for measured quantities, and more particularly to an instrument cluster having a light source that emits light in the form of a virtual pointer that selectively illuminates the measured quantities on a display field, the instrument cluster further comprising at least one user actuated button that selectively blocks or redirects the light to signify a status change.

BACKGROUND

This section provides background information related to the present disclosure which is not necessarily prior art.

Automotive instrument clusters typically comprise large discreet display areas for a speedometer and a tachometer, and a number of smaller displays for coolant temperature, oil pressure, oil temperature, fuel level and the like. Arranged within and around the cluster are other indicators showing low fluid level conditions, turn signal operation, emergency light blinkers and so forth. The analog displays within the display fields can be provided by means of devices having electromechanical movements for causing an angular sweep of a needle across the display field. In many systems, low values of the measured quantity are typically displayed at the left side or bottom of the display field, high values at the right side or top of the display field, and intermediate values at incrementally spaced locations between the left and right sides.

Many instrument clusters also incorporate user actuated members, such as push buttons or rotary switches for performing a predetermined action. For example, push buttons can be incorporated on an instrument cluster to communicate a user input to a display or trip computer, to reset an odometer, reset an oil life indicator, or perform other actions. Display systems, which are described in U.S. Pat. No. 7,193,729 and co-pending U.S. patent application Ser. No. 12/275,365, employ a scanning light source to produce pulsed light beam sweeping across the display field. The present teaching utilizes the same scanning light source and portions of the display field to provide user activated members while keeping all features of the said display system un-affected.

For a display which is created using the scanning light source, it is difficult to package the cables, wires, and electrical switches and components without interfering with the path of light used for the display. Moreover a solution that is flexible in placement of the switches and does not add significant cost or complexity is desired

SUMMARY

This section provides a general summary of the disclosure, and is not a comprehensive disclosure of its full scope or all of its features.

A display for a vehicle can include a display field having at least one user responsive element. The user responsive element can include a fixed mirror and an associated movable light barrier. A pulsed light source can produce a light beam. Means are provided for causing the light beam to repeatedly scan across the display field. A controller can be arranged to repeatedly turn the light source on at one or more predetermined scan positions to illuminate the position of the user responsive element. The controller can also be programmed to act upon a signal regarding the status of the element. A photo detector can send the signal to the controller. The fixed mirror is located to reflect the light beam to the photo detector. The light barrier is positioned to selectively block the light beam from reaching the mirror. In addition to blocking the light, the light barrier may also capture or divert the light to illuminate the user responsive element. The signal from the photo detector informs the controller whether the light barrier has been moved to block the light beam, indicating the status of the element.

According to additional features, the user responsive element can be configured to translate along an axis. The user responsive element can include a button wherein the movable light barrier is fixed for movement with the button. Alternatively, the user responsive element can be comprised of a transparent depression or opening in the front surface where the user can insert a finger or other object such as a pen or pencil to act as a light barrier. The user responsive element can be configured to translate from a first unactuated position to a second actuated position. The button can be biased toward the unactuated positioned. The user responsive element can be configured to rotate about an axis. The status can correspond to a first status wherein the movable light barrier is in a first location and a second status wherein the movable light barrier is in a second location translated along the axis from the first location.

According to still other features, the at least one user responsive element can include a first and a second user responsive element. The controller can determine which of the first or the second user responsive elements has been actuated based on a time and duration of the pulsed light and the signal from the photo detector Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
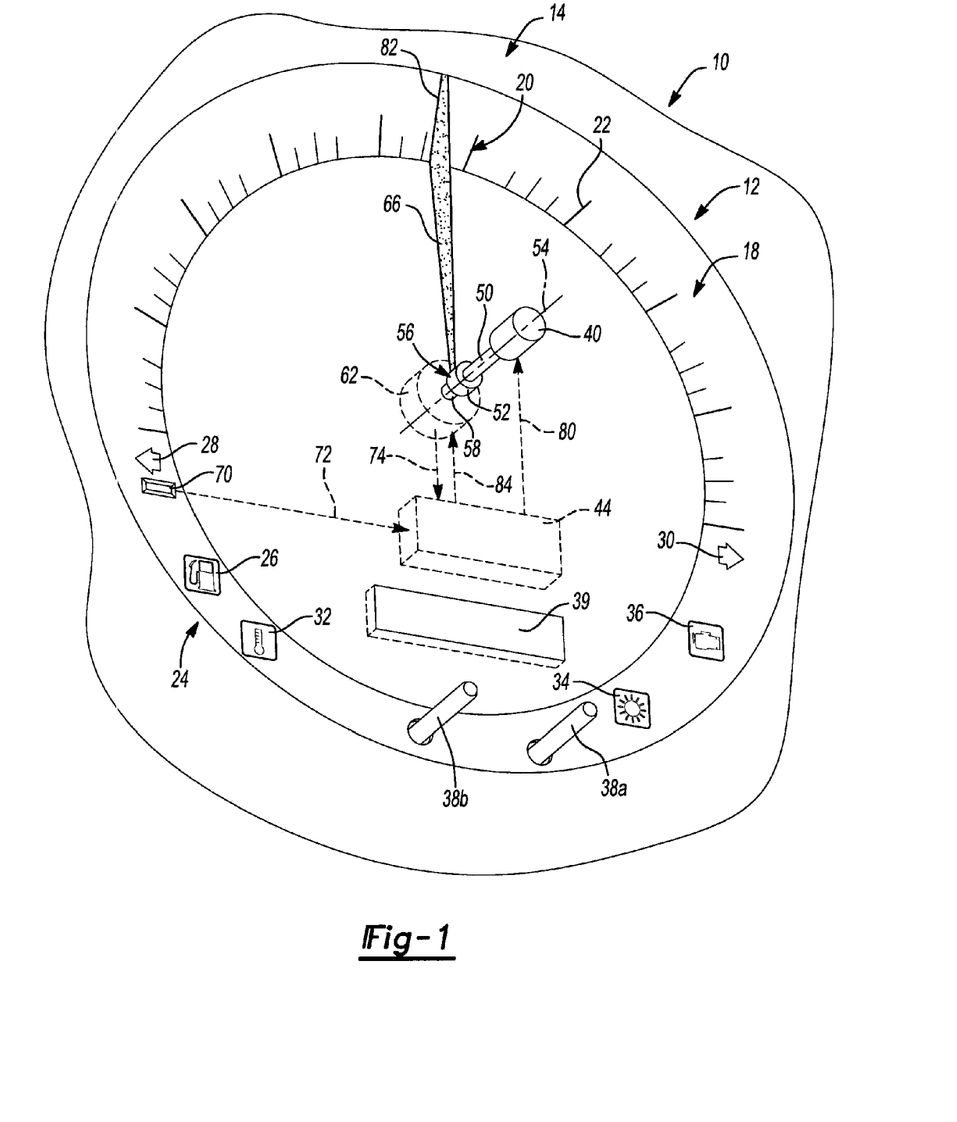
FIG. 1 is a front perspective view of an instrument cluster according to one example of the present teachings.

With initial reference to FIG. 1, an instrument cluster constructed in accordance with one example of the present teachings is shown and generally identified at reference numeral 10. The instrument cluster 10 can include a fascia 12 having a display or activity field 14. The display field 14 can comprise a dial plaque 18. The dial plaque 18 in one exemplary embodiment may be taken to be representative of a speedometer display with low values at the left end and higher values toward the right-most or clockwise end. In this way, the dial plaque can comprise a set of indicia 20 arranged generally around the dial plaque 18 to indicate a measured quantity (such as a vehicle speed). Those skilled in the art will readily appreciate that while the dial plaque 18 has been representative of a speedometer to indicate vehicle speed, the dial plaque 18 can be configured to represent indicia indicative of any measured quantity such as, but not limited to, engine speed (a tachometer), a coolant temperature, a fuel level, an oil pressure, a cabin temperature, and outside temperature, time (a clock) and the like.

It is appreciated that the cluster 10 can be arranged in any vehicle, such as an automobile, an aircraft, a boat, or for various parameters in a power plant or other application displaying information to an operator. The indicia 20 can be in the form of increment or scale markers 22 that may be preprinted on the dial plaque 18 to give values to the measured quantities in miles per hour, kilometers per hour, degrees, rpm, psi, minutes, etc. The outline of the dial plaque 18 may also be printed, embossed or otherwise created on the fascia 12 of the cluster 10 for function and aesthetic appeal.

Various non-analog displays or "telltales" collectively referred to at reference numeral 24 can include a low fuel display 26, turn signal arrows 28, 30, engine temperature 32, high beam light 34 and check engine 36. Other telltales may also be provided. It will be noted that the telltales 24 can be physically arranged so as to correspond generally at an elevation on the dial plaque 18 consistent with the indicia 20.

The user responsive elements or buttons 38a, 38b can be provided on or near the display field 14 of the instrument cluster 10. The portion of the display field occupied by button 38a, 38b is the activity field. As will be described in detail herein, the buttons 38a, 38b can be configured to perform any action, such as but not limited to, resetting a displayed quantity on an information display 39 (i.e., such as a trip odometer) upon user actuation of the buttons 38a, 38b. The buttons 38a, 38b can be actuated by any movement, such as linear translation, rotation about its axis and/or pivoting about an axis.

According to one example, illumination markers are created in the display field 14 around a 360° sweep of the dial plaque 18 to identify a desired, measured quantity value on the dial plaque 18, such as at the indicia 20 as well as concurrently illuminating any combination of the telltales 24 identified above. These illumination markers are created by a light source 40 which operates in an on/off mode under the control of a high-speed controller 44. In one example, the light source 40 can comprise a diode laser. In another implementation the light source 40 can comprise a light emitting diode (LED) and an optical element. The controller 44 can be configured to receive vehicle inputs from various vehicle components (not shown). The controller 44 can include signal interpretation algorithms that interpret the vehicle inputs and generate a set of light source on/off sequential signals as will be described. In one example, multiple transducers can be provided that are capable of sending electrical signals representing instantaneous values of the various measure quantities. The conversion of the electrical signals from analog to digital form may be carried out either within the controller 44 or externally thereof by a suitable ND converter according to the preferences of the system.

The light source 40 according to a first example is configured to output an incident or primary beam of light 50 in a direction toward an optical device 52 that is mounted for rotation about an axis 54. The optical device 52 can be a simple curved surface mirror (like in the example shown in FIG. 1) or other configurations (like the optical device 52' shown in FIG. 2) or more complex optical components or systems that are capable to redirect and spread or focus the incident light.

The optical device 52 can have a reflective surface 56. The optical device 52 can be rotated by way of a shaft 58 that extends from a motor 62 at a high and continuous rate of speed so that the light reflected off the optical device 52 (hereinafter referred to as a secondary beam 66) sweeps angularly across the display field 14 from left to right in a clockwise fashion as explained in greater detail below. In the exemplary configuration of FIG. 1, the optical device 52 is located generally within a boundary of the dial plaque 18 and is operable to reflect light 360° around the dial plaque 18 to illuminate in any combination the indicia 20 and the telltales 24. Additional details regarding the configuration and operation of the optical device 52 or 52' and other suitable optical device configurations may be found in commonly owned U.S. Pat. No. 7,193,729 and co-pending U.S. patent application Ser. No. 12/275,365, which are expressly incorporated herein by reference.

The secondary beam 66 that is reflected off of the optical device 52 can also be reflected toward a photo-detector sensor 70, the output of which is connected as an input signal 72 to the controller 44 for calibrating or "zeroing" purposes explained in detail below. In one example, a signal, hereinafter angular position signal 74 can be sent from the motor 62 to the controller 44 indicative of an angular position of the shaft 58 (and therefore the angular position of the optical device 52). In one example, the motor 62 can be a brushless DC motor.

In operation, the light source 40 can be turned on to produce a calibration pulse, which is directed toward the photo-detector 70. This resets the data in the controller 44 to the zero-sweep position When the angular position determined from the angular position signal 74 satisfies a predetermined value, the controller 44 outputs a signal, hereinafter light signal 80 that turns the light source 40 on and a stripe-like marker of light 82 (FIG. 1) is caused to appear on the dial plaque 18 of the display field 14. The light signal 80 can include light duration and starting point with regard to the angular position signal 74 of the motor shaft 58. The controller 44 can also output a signal, hereinafter a shaft angular speed control signal 84 to the motor 62. The controller 44 can also have a light source driving function that compares the light signal 80 and the angular position signal 74, determined by signal interpretation algorithms in the controller 44 and switch the light source 40 on/off per the comparison result.

With continued reference now to FIGS. 2-4, one example implementation of the present disclosure will be described. A light barrier 90a can be coupled for movement with the button 38a. The button 38a can be biased to a withdrawn or unactuated position (FIG. 4) by a biasing member 39a. A light barrier 90b can be coupled for movement with the button 38b. While the light barriers 90a and 90b have been shown generally adjacent to the respective buttons 38a and 38b in FIG. 2 and below the respective buttons 38a and 38b in FIGS. 3 and 4, the light barriers 90a and 90b can be located at any suitable location for concurrent or subsequent movement with the buttons 38a and 38b. A fixed mirror 92a can be disposed generally adjacent to the button 38a. A fixed mirror 92b can be disposed generally adjacent to the button 38b. A fixed zero position mirror 96 can be provided for reflecting light toward the photo detector 70 as will be described.

Figures 3, 4:
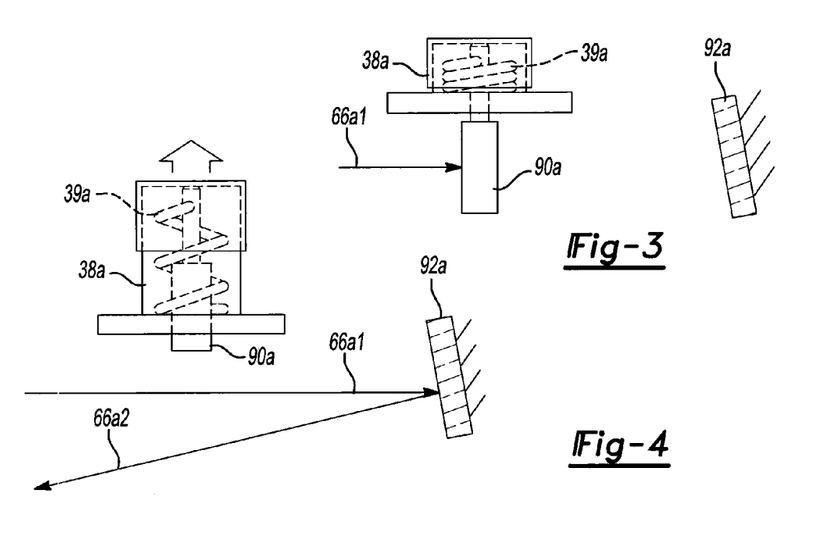
FIG. 3 is a side view of a user responsive element shown in the instrument cluster of FIG. 1 and illustrated in a depressed position.
FIG. 4 is a side view of the user responsive element of FIG. 3 and shown in a withdrawn, undepressed position.

During operation, the respective light barriers 90a and 90b are configured to block the respective secondary beams of light 66a1 and 66b1 from reaching the fixed mirrors 92a and 92b when the respective button 38a or 38b is actuated (FIG. 3). In this way, primary light 50 is emitted from the light source 40 and reflected off surface 56 of the optical device 52' and directed as a secondary beam 66a1 toward the fixed mirror 92a. If the button 38a has not been actuated (such as in a withdrawn position, FIG. 4), the secondary beam 66a1 reflects off of the fixed mirror 92a as a tertiary beam of light 66a2 toward the photo detector 70. If the button 38a is actuated (such as in a depressed position, FIG. 3), the light barrier 90a will block the secondary beam 66a1 from reaching the fixed mirror 92a and therefore preclude creation of the tertiary beam 66a2. Therefore, actuation of the button 38a will preclude a tertiary beam 66a2 from ever reaching the photo detector 70. As can be appreciated, the button 38b can be configured similarly. In this way, actuation of the button 38b can move the light barrier 90b into alignment with the secondary beam 66b1, such that the secondary beam 66b1 cannot reflect off of the fixed mirror 92b as the tertiary light 66b2.

Figure 2:
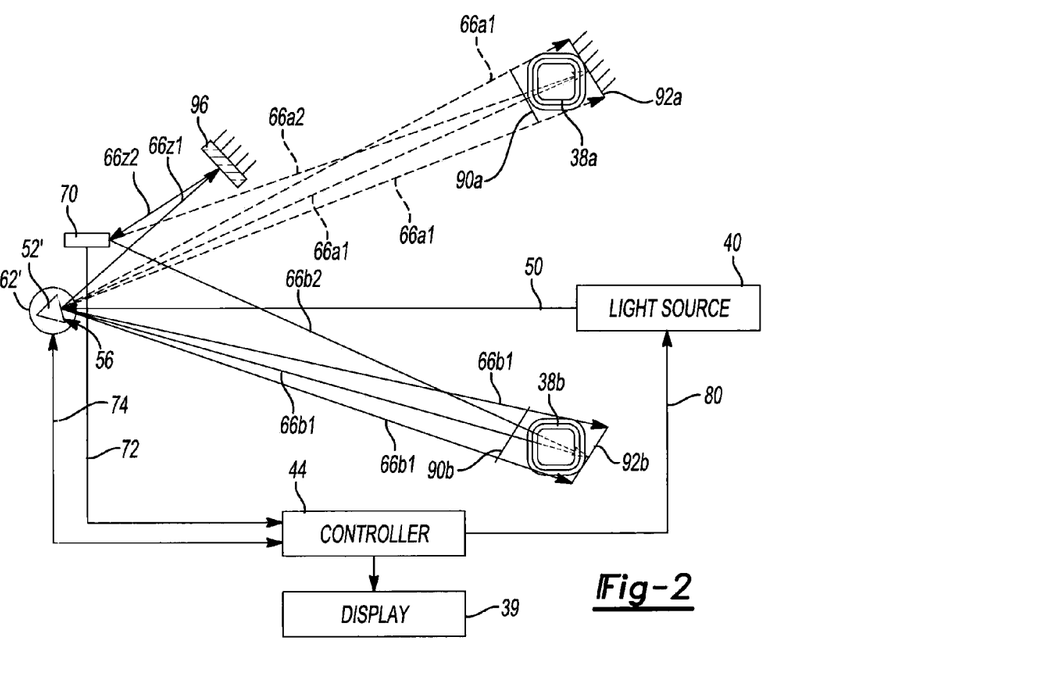
FIG. 2 is a schematic illustration of the instrument cluster shown in FIG. 1 and illustrating an optical device configuration according to additional features of the present teachings.
Figure 5:
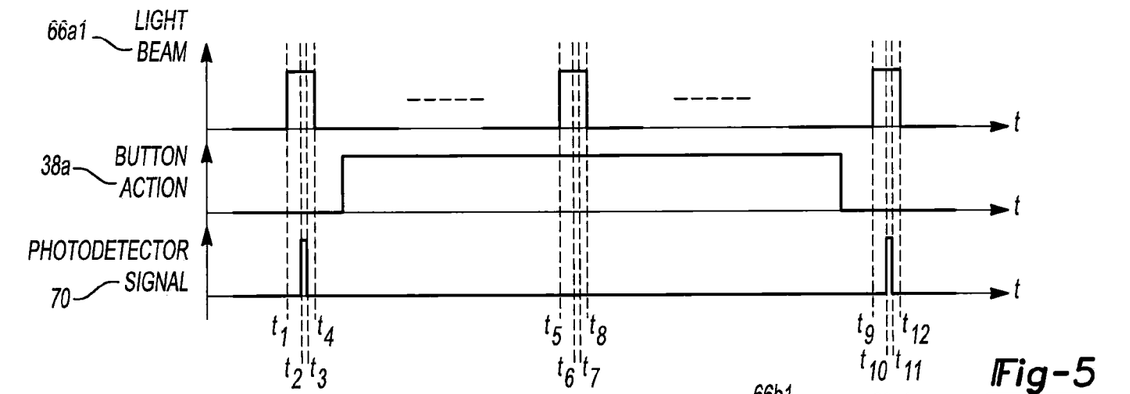
FIG. 5 is an exemplary plot illustrating sequences of a light beam, a button action and a photo detector signal versus time.

With continued reference now to FIGS. 2-4 and additional reference now to FIG. 5, a plot of light beam 66a1, button 38a action and photo detector 70 signal is illustrated versus an exemplary time sequence. During operation, the controller 44 turns on the light source 40 such that the light beam 66a1 is ultimately created from a time $t_1$-$t_4$ and again from time $t_5$-$t_8$ and again at $t_9$-$t_{12}$. It is appreciated that the light beam 66a1 is kept on through the respective durations $t_1$-$t_4$, $t_5$-$t_8$ and $t_9$-$t_{12}$ when the optical device 52' is pointing at the appropriate angle. At some time between $t_2$ and $t_3$, the secondary light 66a1 shines on the fixed mirror 92a and is reflected off as the tertiary beam 66a2, which its aimed onto the photo detector 70. Because the button 38a is not depressed (FIG. 4), the tertiary light 66a2 reaches the photo detector 70 and the photo detector 70 produces a signal 72 back to the controller 44. In one example, the photo detector 70 can generate a pulse signal during time $t_2$-$t_3$ indicating that the button 38a is not depressed.

At some time between $t_4$ and $t_5$, the button 38a is depressed causing the movable light barrier 90a to block the secondary beam 66a1 from reaching the fixed mirror 92a. As a result, the scheduled pulse on the signal 72 is missing from the time duration $t_6$ to $t_7$, indicating that the button 38a is depressed (FIG. 3). At some time before $t_9$, the button 38a is released causing the movable light barrier 90a to withdraw and the secondary beam 66a1 to reach the fixed mirror 92a again. As a result, the scheduled pulse on the signal 72 appears in the time duration between $t_{10}$-$t_{11}$ indicating that the button 38a is not depressed.

In one example, the time duration between $t_4$ and $t_5$, as well as $t_8$-$t_9$ can be equivalent to a single revolution of the optical device 52'. In another example, these times can define multiple revolutions of the optical device 52'. According to one configuration, the maximum toggle rate of the button 38a can be the same as the rotating rate of the optical device 52'. In this way, the controller 44 is not able to identify more than one button action (pushing or releasing) at an individual button within a rotating period of the optical device 52'.

Figure 6:
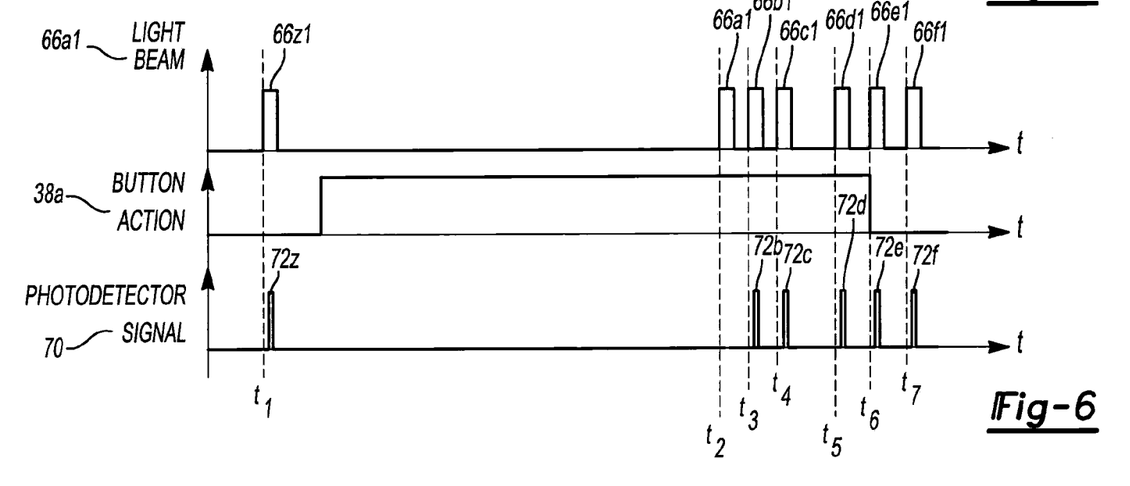
FIG. 6 is an exemplary plot illustrating a light beam, button action and a photo detector signal for six distinct user responsive elements versus time.

Turning now to FIG. 6, a time sequence example is shown for a configuration having six buttons (such as 38a-38f, not all specifically shown). Buttons 38c-38f can interact with light beams 66c1-66f1. The exemplary time sequence illustrates actuation of the button 38a from a time after $t_1$ to a time $t_6$. According to the present teachings, for multiple button implementations, since the controller 44 is aware of the exact moment of turning on and the duration of a respective light beam (66a1-66f1) for each of the buttons (38a-38f), the controller 44 is able to distinguish which missing pulse (photo detector signals 72a-72f) from the photo detector 70 is for which of the respective buttons 38a-38f in the case where multiple push-buttons are pressed simultaneously.

The fixed zero position mirror 96 (FIG. 2) reflects a secondary beam 66z1 as a tertiary beam 66z2. The zero position mirror 96 is strategically placed such that the time period of $t_1$-$t_2$ is significantly different than that of $t_2$-$t_7$-$t_1$. Therefore with proper algorithms, the controller 44 is able to distinguish the pulse 72z from other pulses by computing the time period between the pulses. This helps the system establishing synchronization during the start up and can be used for continuous synchronization. In the event that all buttons 38a-38f are depressed, the controller 44 receives only one pulse 72z. As shown in FIG. 6, when the button 38a is depressed, the associated photo detector signal (i.e., 72a) is absent.

Figure 7:
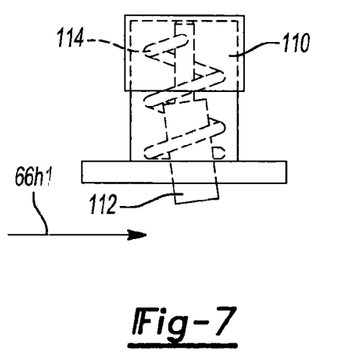
FIG. 7 is a side view of a user responsive element constructed in accordance to additional features of the present teachings and shown in a withdrawn or undepressed position.
Figure 8:
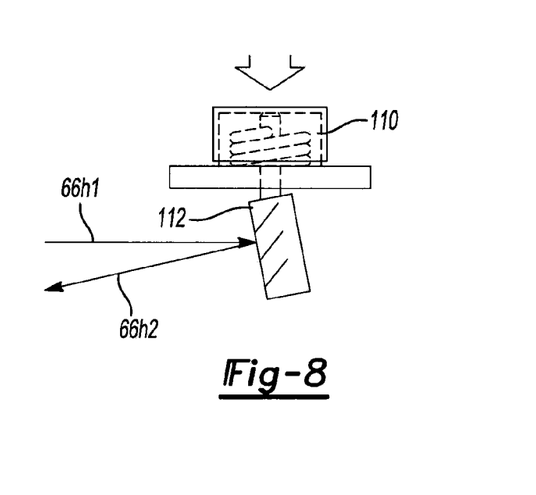
FIG. 8 is a side view of the user responsive element of FIG. 7 and shown in a depressed position.

With reference now to FIGS. 7 and 8, a button 110 constructed in accordance to another implementation of the present teachings will be described. The button 110 can be movably coupled with a mirror 112. A biasing member 114 can bias the button 110 into the unactuated position (FIG. 7). In the configuration shown in FIGS. 7 and 8, a secondary light beam 66h1 is not reflected to the photo detector 70 unless the button 110 is depressed. In other words, instead of seeking a missed pulse of light, the controller 44 is configured to search for present pulses to identify button activities.

Figure 9:
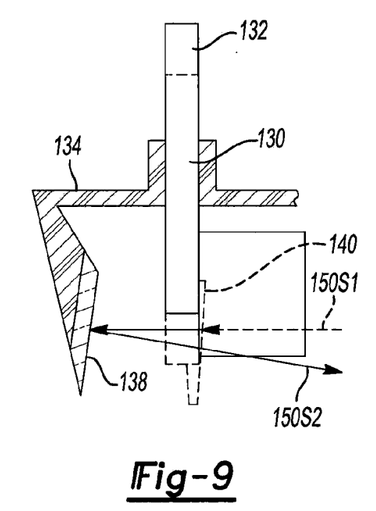
FIG. 9 is a side view of a user responsive element configured for translation and rotation according to additional features of the present teachings.
Figure 10:
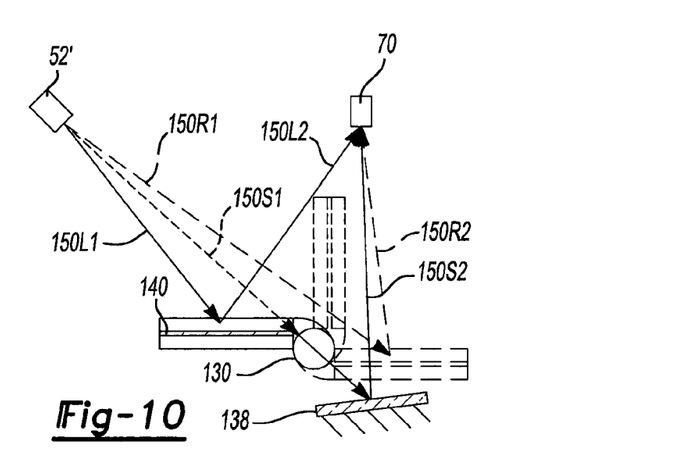
FIG. 10 is a plan view of the user responsive element of FIG. 9.

Turning now to FIGS. 9 and 10, additional features of the present teachings will be described. In other configurations, the button can be configured as a stem 130 having a user engaging portion 132 supported within a stem rack 134. A fixed mirror 138 can be supported by the stem rack 134. A distal end of the stem 130 can support a double sided mirror 140. The stem 130 can be configured to have six possible statuses: inactive, pushed only, turn left 90° only, turn right 90° only, push and turn left 90°, and push and turn right 90°. When turning the stem 130 left 90° (shown in solid line, FIG. 10), an incident beam 150L1 is reflected off the mirror 140 to the photo detector 70 as a secondary beam 150L2. When turning the stem 130 to the right 90° (shown in dashed line, FIG. 10), the incident beam 150R1 is reflected to the photo detector 70 as the secondary beam 150R2. The location of the mirror 140 in an unrotated position is illustrated in dotted line in FIG. 10.

When the stem 130 is not depressed, as shown in solid line in FIG. 9, the incident beam 150S1 is reflected to the photo detector 70 as a secondary beam 150S2. When the stem 130 is depressed, as shown in dashed line in FIG. 9, the incident beam 150S1 is blocked by the stem 130. Therefore, the photo detector 70 will not receive the scheduled beam 150S2. When the stem 130 is not turned nor depressed, the photo detector 70 receives only the beam 150S2. By combining the above examples, the controller 44 is able to distinguish the status of the stem 130 and act upon the signals (such as the pulse signals 72 discussed above) appropriately.

Figure 11:
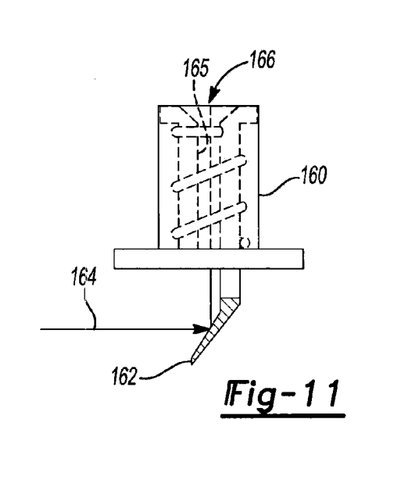
FIG. 11 is a side view of a user responsive element, a button in the normal position illuminated by the light beam and blocking the light from the fixed mirror and the photo detector.
Figure 12:
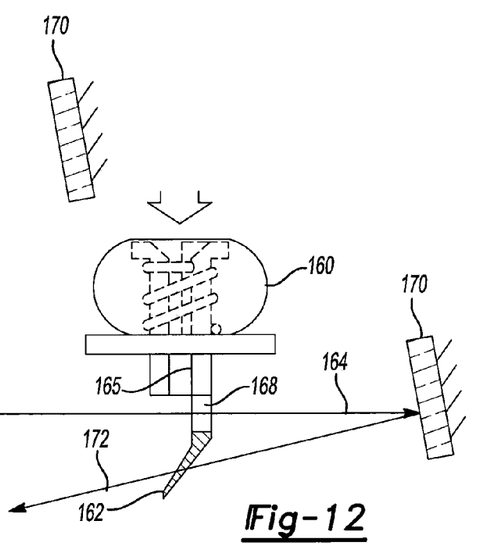
FIG. 12 is a side view of a user responsive element, a button in the actuated position with light passing to the photo detector via the fixed mirror.

With reference now to FIGS. 11 and 12, a button 160 constructed in accordance to another implementation of the present teachings will be described. The button 160 can have as part of its construction an optical component 162, which reflects the light 164 in such a way as to illuminate a face 166 of the button 160. In FIG. 11 it is shown that when the button 160 is in the normal (unactuated) position, after the light beam 164 strikes the optical element 162 it passes through a first opening 165 in the body of the button 160 and illuminates the face 166 of the button 160. In FIG. 12 it is shown that when the button 160 is in the actuated position the light beam 164 passes through a second opening 168 in the button 160 and is reflected from a fixed mirror 170. The reflected light 172 can be directed to a photo detector such as described above. Of note, the button 166 includes an elastomeric or flexible material that can bulge outwardly (FIG. 12) as a result of actuation. It is noted that the elastomeric button configuration of FIGS. 11 and 12 can be used for any button disclosed herein.

Figures 13, 14:
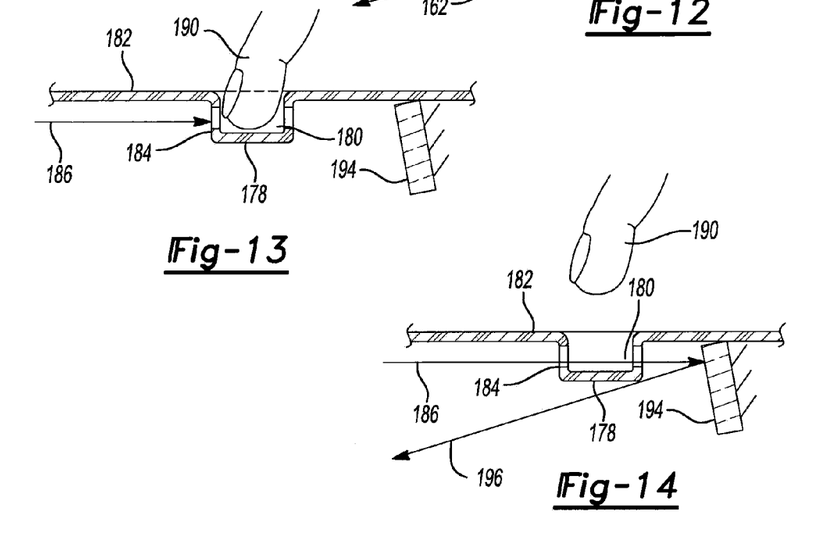
FIG. 13 is a side view of the user responsive element, in the actuated position using a finger to block the light.
FIG. 14 is a side view of the user responsive element, in the normal position without a light blocking object present, and with light passing to the reflector and to the photo detector.

With reference now to FIGS. 13 and 14, a user interface 178 can be constructed using a cavity 180 formed in a front surface 182 (i.e., of the instrument cluster) such that walls 184 defining the cavity 180 allow light beam 186 to pass when a blocking element 190 is not present. In the exemplary drawings, the blocking element 190 is a finger but it can be a pencil, pen, or any other object which can fit into the cavity 180 and also block the light beam 186. In FIG. 13 the user interface 178 is in the actuated mode with the blocking element 190 in the cavity 180 and blocking the light beam 186. In FIG. 14 the user interface 178 is in the normal (unactuated) mode as the blocking element 190 is removed from the cavity 180 and the light beam 186 is incident on fixed mirror 194. The reflected light 196 can be directed to a photo detector such as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A user interface display system comprising:
   at least one user responsive element, the at least one element including a user activated optical mechanism;
   a pulsed light source producing a light beam;
   a means for causing the light beam to repeatedly scan across an activity field;
   a controller arranged to repeatedly turn the light source on at one or more predetermined scan positions to illuminate the at least one element, the controller also being programmed to act upon a signal regarding a status of the element; and
   a photo detector for sending the signal to the controller, wherein the optical mechanism of the at least one element is located in the optical path between the light source and the photo detector, and the optical mechanism of the at least one element is positioned to selectively act on the light beam causing the signal from the photo detector changing status and indicating the status of the element.

2. The user interface display system of claim 1 wherein the user responsive element is configured to have at least two selectable positions.

3. The user interface display system of claim 2 wherein the user responsive element includes a button and wherein the movable optical mechanism is fixed for movement with the button.

4. The user interface display system of claim 3 wherein the optical mechanism includes a fixed mirror and a moveable light barrier.

5. The user interface display system of claim 1 wherein the user responsive element is configured to translate from a first unactuated position to a second actuated position.

6. The user interface display system of claim 3 wherein the optical mechanism illuminates at least a portion of the button.

7. The user interface display system of claim 5 wherein the button is biased toward the unactuated position.

8. The user interface display system of claim 3 wherein the user responsive element is configured to rotate about the axis.

9. The user interface display system of claim 4 wherein the status corresponds to a first status wherein the movable light barrier is in a first location and a second status wherein the movable light barrier is in a second location translated from the first location.

10. The user interface display system of claim 1 wherein the at least one user responsive element comprises a first and a second user responsive element.

11. The user interface display system of claim 10 wherein the controller determines which of the first or second user responsive elements has been actuated based on a time and duration of the pulsed light.

12. The user interface display system of claim 1 wherein the pulsed light source is configured to illuminate a gauge on the display field.

13. A user interface display system comprising:
   an activity field including at least one user responsive element, the at least one element including a button including an optical mechanism fixedly coupled therewith;
   a pulsed light source producing a light beam;
   means for causing the light beam to repeatedly scan across the activity field;
   a controller arranged to repeatedly turn the light source on at one or more predetermined scan positions to illuminate the at least one element, the controller also being programmed to act upon a signal regarding a status of the element; and
   a photo detector for sending the signal to the controller, wherein the optical mechanism of the at least one element is located in the optical path between the light source and the photo detector, whereby the signal from the photo detector informs the controller whether the optical mechanism has been moved to act upon the light beam toward the photo detector, indicating the status of the element.

14. The user interface display system of claim 13 wherein the user responsive element translates from one location to another concurrently with the mirror.

15. The user interface display system of claim 14 wherein the optical mechanism has the affect of illuminating the button.

16. The user interface display system of claim 14 wherein the button is configured to indicate at least three statuses including a first status resulting from the button being unactuated, a second status resulting from the button being depressed and a third status resulting from the button being rotated to a first location.

17. The user interface display system of claim 16 wherein the button is configured to indicate a fourth status resulting from the button being depressed and rotated to a first location.

18. The user interface display system of claim 17 wherein the button is configured to indicate a fifth status resulting from the button being rotated to a second location.

19. The user interface display system of claim 18 wherein the button is configured to indicate a sixth status resulting from the button being depressed and rotated to the second location.

* * * * *